United States Patent [19]
Blanyer

[11] 3,755,734
[45] Aug. 28, 1973

[54] FREQUENCY DEVIATION MONITOR AND MEASURING DEVICE

[75] Inventor: Carl G. Blanyer, Thousand Oaks, Calif.

[73] Assignee: Abex Corporation, New York, N.Y.

[22] Filed: July 24, 1972

[21] Appl. No.: 274,203

[52] U.S. Cl. ............................. 324/78 Z, 328/141
[51] Int. Cl. ........................................... G01r 23/02
[58] Field of Search ................ 324/78 Q, 78 Z, 82; 328/141; 179/69 M

[56] References Cited
UNITED STATES PATENTS
2,480,128   8/1949   Frum .............................. 324/78 Z Primary Examiner—Alfred E. Smith
Attorney—James B. Kinzer and Thomas E. Dorn

[57] ABSTRACT

A frequency deviation monitor for measuring instantaneous variations of an input signal from a reference frequency, including an input circuit developing an intermediate signal of constant amplitude, a phase-shifting circuit that shifts the signal in phase by an amount and in a direction representative of deviations of the signal from a given reference frequency, and a key signal generator that develops short-duration key signal pulses at the input signal frequency. The signals from the phase-shifting circuit and the key signal generator are applied to a sampling demodulator that develops an output signal having an amplitude and polarity indicative of the deviation of the input signal fro m the reference frequency.

9 Claims, 4 Drawing Figures

PATENTED AUG 28 1973 3,755,734

FIG.2 TO DEMODULATOR 16 (FIG 3)

FREQUENCY DEVIATION MONITOR AND MEASURING DEVICE

BACKGROUND OF THE INVENTION

A variety of different circuits have been proposed and utilized for monitoring the frequency of an A.C. generator or other signal source. The counters and analog frequency meters ordinarily employed for this purpose are effective for long-term measurements and for control of steady-state conditions. Moreover, instruments of this kind have been constructed that provide an analog output voltage that varies in amplitude with changes in frequency. Typically, however, the output from conventional frequency monitoring circuits does not change rapidly enough to provide adequate observation or recording, by oscilloscope or pen recorder, of either transient frequency changes or other relatively rapid frequency variations.

In most frequency controllers and other frequency monitoring devices, the basic system includes, at some point, a circuit that produces a signal that does reflect the occurrence of transient frequency changes or other repetitive rapid frequency deviations. Ordinarily, however, although such a signal can be extracted from the system, it will include a rather large ripple component. The filtering necessary to obtain a usable signal smooths out any rapid fluctuations. As a consequence, the signal, and the system, are at least inconvenient and often entirely useless in the measurement of short-term frequency variations.

SUMMARY OF THE INVENTION

It is a principal object of the present invention, therefore, to provide a new and improved frequency deviation monitor capable of effective measurement of, and, where required, the recording of transient changes in frequency and other repetitive short-term variations in frequency of an input signal.

A related object of the invention is to provide a new and improved frequency deviation monitor that develops an output signal which varies in amplitude and polarity in accordance with the instantaneous deviation of an input signal from a reference frequency, with negligible ripple and requiring only limited filtering.

A further object of the invention is to provide a new and improved frequency deviation monitors for measuring the instantaneous deviation of an input signal from a reference frequency, that is effective to provide a sustained indication of maximum frequency deviation over a given period of time.

A specific object of the invention is to provide a new and improved frequency deviation monitor, for measuring the instantaneous variations of an input signal from a reference frequency, that is relatively simple and inexpensive in construction yet highly reliable in operation.

A frequency deviation monitor for measuring the instantaneous deviation of an input signal from a reference frequency, constructed in accordance with the invention, comprises an input circuit for developing an intermediate signal having a frequency corresponding to the frequency of an applied input signal and having a constant amplitude. Phase-shifting means are coupled to the input circuit to generate a phase-shift signal having a frequency corresponding to the frequency of the intermediate signal but shifted in phase by an amount and in a direction indicative of any deviation of the intermediate signal (and hence the input signal) from a given reference frequency. Key signal generator means, coupled to the input circuit, generate a key signal comprising a series of key pulses each having a duration much shorter than a half cycle of the intermediate signal and recurring at an integral multiple of the intermediate signal frequency. A sampling demodulator, coupled to the phase-shifting means and to the key signal generator means, samples the phase-shift signal at time intervals determined by the key signal pulses to develop an output signal having an amplitude and a polarity representative of the amount and direction of any instantaneous deviation of the input signal from the reference frequency.

DESCRIPTION OF THE PREFERRED EMBODIMENT

Figure 1:
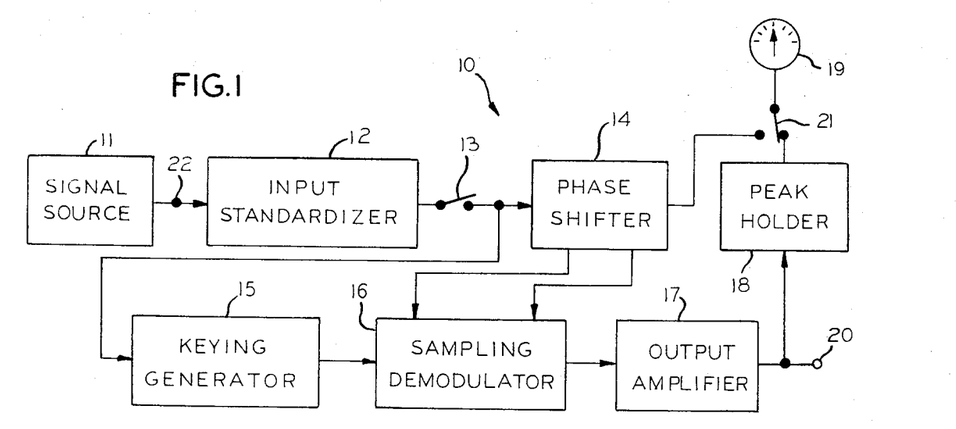
FIG. 1 is a block diagram of a frequency deviation monitor constructed in accordance with the present invention.

FIG. 1 illustrates, in block diagram form, a frequency deviation monitor 10 constructed in accordance with a preferred embodiment of the present invention. The frequency deviation monitor 10 comprises an input standardizer circuit 12 to which a signal source 11 is connected at an input terminal 22. Signal source 11 may comprise a generator or any other apparatus developing an A.C. signal for which it is necessary or desirable to observe and possibly record transient frequency changes and other short-term frequency deviations.

The input circuit 12 is coupled, through a switch 13, to a phase-shifter circuit 14 and to a keying signal generator 15. The keying signal generator 15 develops a pulse keying signal that is supplied to a sampling demodulator 16. The output from phase-shifter 14, comprising a pair of phase-shift signals that have the same frequency as the input signal but have been shifted in phase in accordance with any deviation of that signal from a given reference frequency, is also applied to demodulator 16. Demodulator 16 is coupled to an amplifier 17, the output signal from amplifier 17 appearing at an output terminal 20. The output signal from amplifier 17 may also be applied to a peak holder circuit 18 connected to an indicating instrument 19 through a calibration switch 21. Switch 21 may be actuated to connect the indicating instrument 19 directly to one of the outputs of phase-shifter 14, as described more fully hereinafter.

In operation, an A.C. signal from source 11 is supplied to the input standardizer circuit 12 in frequency deviation monitor 10. The input standardizer circuit 12 develops an intermediate signal having a frequency corresponding to the input signal frequency but with a constant signal amplitude. This is done to avoid any spurious responses, in the output of the monitor system 10, that might otherwise result from variations in the amplitude of the signal from source 11.

The constant-amplitude intermediate signal from circuit 12 is supplied to both the phase-shifter circuit 14 and the keying signal generator 15; switch 13 is closed in normal operation of device 10. The phase-shifter circuit 14 generates a phase-shift signal having a frequency corresponding to the intermediate signal frequency but shifted in phase by an amount and in a direction indicative of any deviation of the intermediate signal (and hence the input signal) from a given reference frequency. The reference frequency is determined by an appropriate tuned circuit in the phase-shifter circuit 14. Some adjustment of the reference frequency may be provided. The phase-shift signal developed in circuit 14 is supplied to the sampling demodulator 16; preferably, a push-pull output is utilized for phase shifter 14, two phase-shift signals being applied to demodulator 16 with 180° phase displacement between them.

The intermediate constant-amplitude signal from the input standardizer circuit 12 is also applied to the keying generator 15, which develops a keying signal comprising a series of key pulses of very short duration, much shorter than a half cycle of the intermediate signal, the keying pulses recurring at an integral multiple of the intermediate signal frequency. In demodulator 16, the phase-shift signals from circuit 14 are sampled at time intervals determined by the key signal pulses from generator 15. This develops an output signal having an amplitude representative of the amount of deviation of the input signal from the reference frequency and having a polarity which indicates the direction of that deviation. The output signal is amplified in the amplifier 17, which may also provide some correcting and compensating functions as described below. The amplified output signal appearing at the terminal 20 may be used to drive an oscilloscope, a pen recorder, or other display or recording means.

Where it is desirable to measure maximum frequency variations, the output signal from amplifier 17 may also be applied to the peak holder circuit 18. In the peak holder circuit, the peak output signal is effectively stored for time intervals adequate to identify maximum amplitude changes, and thus to identify maximum frequency variations in the input signal from source 11. On the other hand, the peak holder circuit 18 may be effectively bypassed, applying the output signal from amplifier 17 to the indicating instrument 19 without substantial change, giving a direct instrument readout of frequency variations as measured by device 10.

Figure 2:
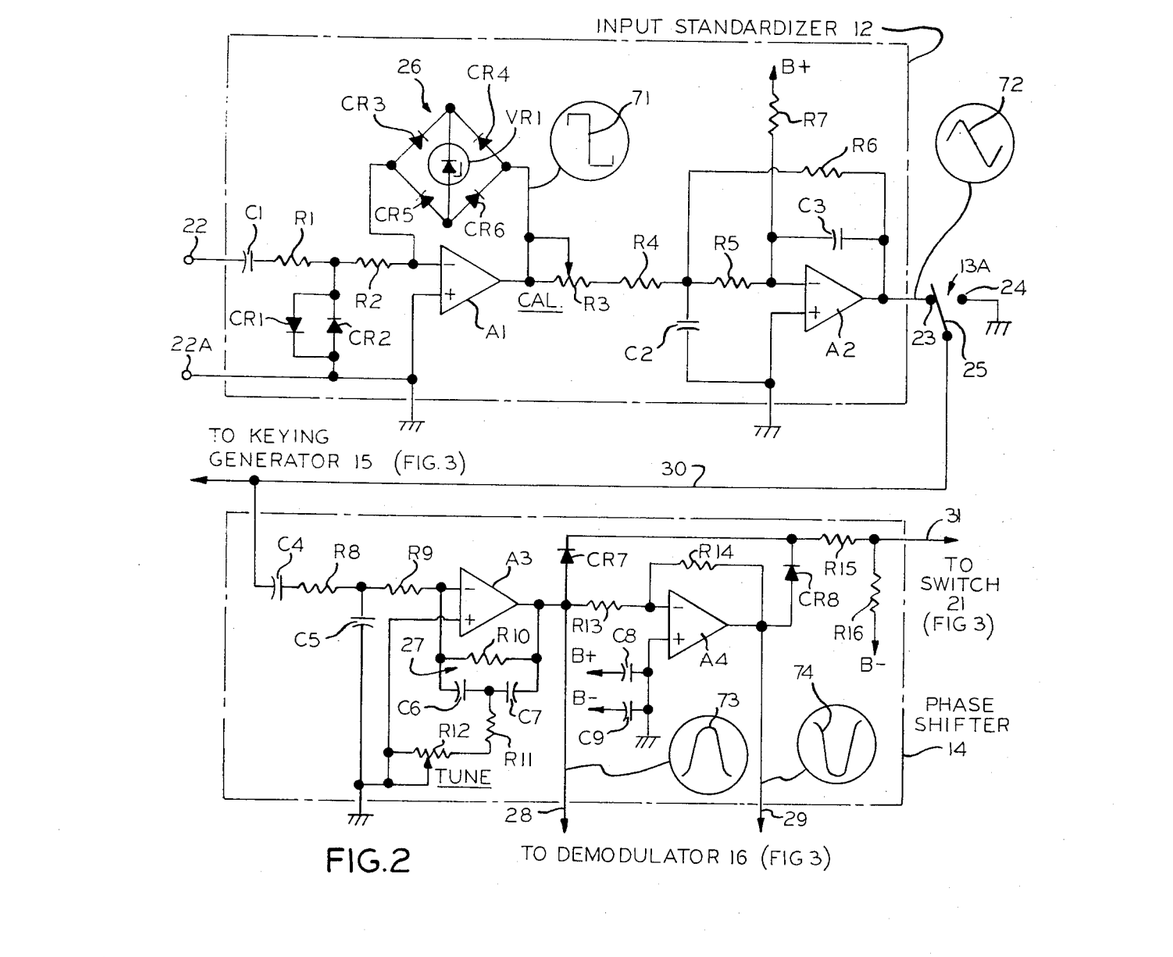
FIG. 2 is a schematic diagram of an input standardizer circuit and a phase-shifter circuit for the device of FIG. 1.

FIG. 2 illustrates complete operational circuits for the input standardizer circuit 12 and the phase shifter circuit 14. As shown therein, the input circuit 12 comprises an operational amplifier A1 having its inverting input connected to the input terminal 22 by a series circuit comprising a capacitor C1, a resistor R1, and a resistor R2. The junction between the resistors R1 and R2 is connected to a pair of diodes CR1 and CR2, the diodes being in parallel with each other and with opposed polarities; the diodes CR1 and CR2 are returned to a second input terminal 22A. Terminal 22A is connected to a plane of reference potential indicated as system ground. The non-inverting input of amplifier A1 is also connected to system ground.

The output of amplifier A1 is connected to a negative feedback circuit comprising a diode bridge 26. Bridge 26 includes the diodes CR3, CR4, CR5 and CR6, with a voltage regulator diode VR1 connected across the bridge. The feedback circuit comprising bridge 26 is returned to the inverting input of amplifier A1.

The output of amplifier A1 is connected to the inverting input of a second operational amplifier A2 through a series circuit comprising a calibrating potentiometer R3, a resistor R4, and a resistor R5. A capacitor C2 is connected from the common terminal of resistors R4 and R5 to system ground. The inverting input of amplifier A2 is connected to a resistor R7 that is in turn connected to a positive-polarity DC supply designated as B+.

The output of amplifier A2 is connected to a feedback resistor R6 that is connected back to the common terminal of the series input resistors R4 and R5. A capacitor C3 is connected from the output of amplifier A2 back to the inverting input of the amplifier. The output of amplifier A2 is also connected to one fixed contact 23 of a double-throw switch 13A that is a part of the switch 13 (FIG. 1). The other fixed contact 24 of switch 13A is connected to system ground. The movable contact 25 of switch 13A is connected to a conductor 30 in turn connected to the keying generator 15 (FIG. 3) and to a capacitor C4 in the input circuit of phase-shifter 14.

The input circuit of phase-shifter 14 includes two resistors R8 and R9 connected in series from capacitor C4 to the inverting input of an operational amplifier A3. The common terminal of resistors R8 and R9 is connected to a capacitor C5 that is returned to ground. The non-inverting input of amplifier A3 is grounded.

Amplifier A3 is provided with a negative feedback circuit 27, connected from the amplifier output to its inverting input, that constitutes a bridged-T notch network. The negative feedback circuit 27 includes a resistor R10 connected from the output of amplifier A3 to the inverting input of the amplifier. Two capacitor C6 and C7 are connected in series with each other and in parallel with resistor R10. The common terminal of capacitors C6 and C7 is returned to ground through the series conbination of a resistor R11 and a tuning potentiometer R12.

One output from phase-shifter 14 is taken directly from the output terminal of amplifier A3, which is connected to demodulator 16 (FIG. 3) by a conductor 28. A second output, with a phase displacement of 180°, is afforded by an inverting amplifier A4. The inverting input of amplifier A4 is connected to the output of amplifier A3 by a coupling resistor R13. A negative feedback resistor R14 is connected from the output of amplifier A4 to the inverting input of the amplifier. The non-inverting input of the amplifier A4 is connected to system ground. The non-inverting input of amplifier A4 is also bypassed to the B+ supply through a capacitor C8 and is connected to a capacitor C9 that is returned to the negative D.C. supply for the system, designated as B−. The output of amplifier A4 is connected to a conductor 29 that extends to demodulator 16 (FIG. 3).

A calibrating output is also taken from the phase shifter 14. This output circuit comprises a diode CR7 connected to the output of amplifier A3 and a diode CR8 connected to the output of amplifier A4. The two diodes CR7 and CR8 are connected to a resistor R15 that is in turn connected to a resistor R16 which is returned to the B− supply. The common terminal of resistors R15 and R16 is connected to the switch 21 (FIGS. 1 and 3) by a conductor 31.

Figure 3:
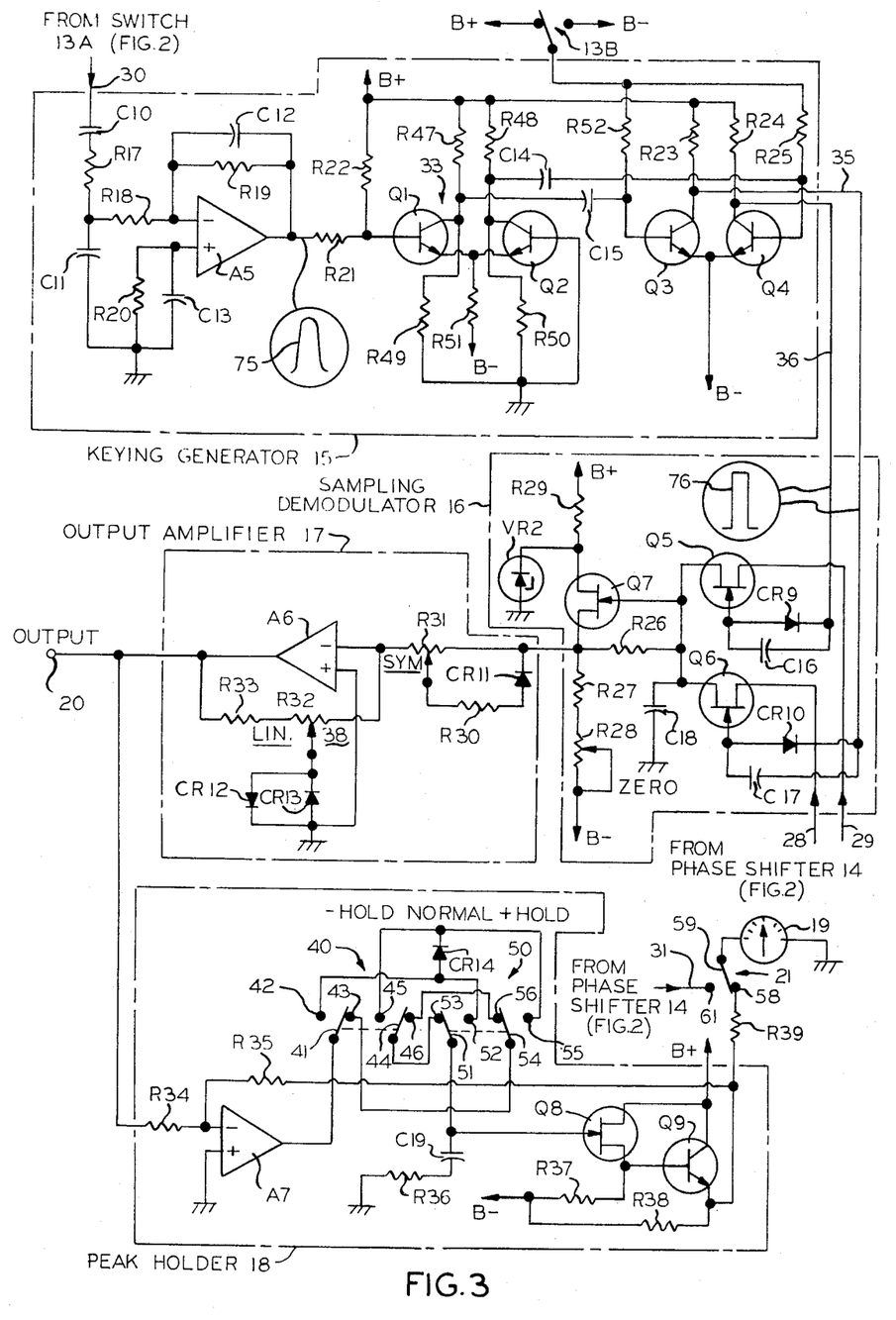
FIG. 3 is a schematic circuit diagram of a keying generator, a sampling demodulator, an output amplifier and a peak holder circuit for the device of FIG. 1.

FIG. 3 illustrates a preferred circuit arrangement for keying generator 15, sampling demodulator 16, output amplifier 17, and peak holder circuit 18. As shown therein, the conductor 30 from the output of circuit 12 (FIG. 2) is connected to a coupling capacitor C10 that is in turn connected to the inverting input of an operational amplifier A5 through the series combination of a resistor R17 and a resistor R18. A capacitor C11 is connected to the common terminal of the resistors R17 and R18 and is returned to ground. A parallel RC filter comprising a resistor R20 and a capacitor C13 is connected from the non-inverting input of amplifier A5 to system ground.

Amplifier A5 is provided with a negative feedback circuit comprising a resistor R19 connected from the output of the amplifier back to its inverting input. A capacitor C12 is connected in parallel with resistor R19.

The output of amplifier A5 is coupled through a resistor R21 to the base of transistor Q1 which, with a second transistor Q2, forms a differential squaring amplifier 33. The base of transistor Q1 is connected to a resistor R22 that is in turn connected to the B+ supply. The collector of transistor Q1 is connected to a load resistor R47 that is returned to the B+ supply and is also connected to a resistor R49 that is returned to ground. The emitter of transistor Q1 is directly connected to the emitter of transistor Q2 and these two electrodes are connected to a resistor R51 that is returned to the B+ supply. The base of transistor Q2 is grounded; the collector is connected to the B+ supply through a load resistor R48 and to system ground through a resistor R50.

The differential squaring amplifier 33 has two outputs that are coupled to two driver transistors Q3 and Q4. Thus, the collector of transistor Q1 is coupled through a capacitor C15 to the base of transistor Q3. The base of transistor Q3 is also connected to a resistor R52 that is normally returned to the B+ supply through a double-throw switch 13B that is ganged with the switch 13A (FIG. 2). The emitter of transistor Q3 is connected to the B− supply. The collector of transistor Q3 is connected to a load resistor R23 that is returned to the B+ supply and is also connected to a conductor 35 that connects the keying generator 15 to the sampling demodulator 16.

The circuit for transistor Q4 corresponds to that of transistor Q3. Thus, the base of transistor Q4 is coupled by a capacitor C14 to the collector of transistor Q2. The base of transistor Q4 is also connected to a resistor R25 that is normally returned to the B+ supply through switch 13B. The collector of transistor Q4 is connected to a load resistor R24 that is returned to the B+ supply and is also connected to a conductor 36 that extends to the sampling demodulator 16. It should be noted that switch 13B is shown in the normal operating position for the frequency deviation monitor; it has an alternate position in which the load resistors R52 and R25 are connected to the B− supply instead of the B+ supply.

The input stage of sampling demodulator 16 comprises two FET transistors Q5 and Q6. The gate electrode of transistor Q5 is connected, through the parallel combination of a capacitor C16 and a diode CR9, to the output conductor 36 from keying generator 15. One of the main electrodes of transistor Q5 is connected to the conductor 29 that constitutes one of the outputs of the phase shifter 14 (FIG. 2). The other main electrode of the FET transistor Q5 is connected to a storage capacitor C18 that is returned to system ground. The circuit for the FET transistor Q6 is similar; the gate electrode is connected to conductor 35 through the parallel combination of a capacitor C17 and a diode CR10. One of the main electrodes of the transistor Q6 is connected to the conductor 28 that constitutes one of the outputs of phase-shifter 14. The other main electrode, comprising the output electrode for transistor Q6, is connected to the storage capacitor C18.

Demodulator 16 further comprises a buffer stage including an FET transistor Q7 having its gate electrode connected to the output electrodes of the FET switches Q5 and Q6. One main electrode of transistor Q7 is connected to a resistor R29 that is in turn connected to the B+ supply; this same electrode of transistor Q7 is also returned to ground through a voltage regulator diode VR2. The other main electrode of the FET switch Q7 is connected to a resistor R26 that is connected back to the gate electrode of the transistor. This second main electrode for the FET transistor Q7 is connected to the B+ supply through the series combination of a resistor R27 and a zero-adjustment potentiometer R28.

Output amplifier 17, in the circuit illustrated in FIG. 3, comprises an operational amplifier A6 having its inverting input connected to the second main terminal of FET transistor Q7 in sampling demodulator 16 by a circuit comprising, in series, a potentiometer R31. The input circuit for amplifier A6 having includes a resistor R30 connected to the tap on potentiometer R31 and a diode CR11 connected from resistor R30 back to the output electrode of the FET device Q7. Potentiometer R31 is employed for symmetry adjustment, as described more fully hereinafter.

The non-inverting input of amplifier A6 is connected to system ground. The output of amplifier A6 is connected to a resistor R33 in series with a potentiomter R32 that is returned to the inverting input of the amplifier as a part of a negative feedback circuit 38. The tap on potentiometer 32, which is utilized for a linearity adjustment, is connected to parallel diodes CR12 and CR13, which are oppositely polarized, and which are returned to system ground. The output terminal of amplifier A6 is the output for circuit 17, and is connected to the output terminal 20.

The peak holder circuit 18, in the form illustrated in FIG. 3, includes an operational amplifier A7 having its inverting input connected to a resistor R34 that is in turn connected to output terminal 20. The non-inverting input of amplifier A7 is connected to system ground. The output of amplifier A7 is connected to the first movable contact 41 of a double-pole double-throw switch 40. The movable contact 41 is engageable with either of two fixed contacts 42 and 43. The other pole of switch 40 comprises a movable contact 44 engageable with either of two fixed contacts 45 and 46. Switch 40 is used in conjunction with a similar double-pole double-throw switch 50 having a first movable contact 51 engageable with either of two fixed contacts 52 and 53 and a second movable contact 54 engageable with either of two fixed contacts 55 and 56.

Contact 42 of switch 40 is connected to contact 52 of switch 50 and to the anode of a blocking diode CR14. The fixed contact 43 of switch 40 is connected to the movable contact 54 of switch 50. The switch contacts 46 and 56 are connected together. The fixed contacts 45 and 55 are connected together and are connected to the cathode of diode CR14. The output from the switch assembly 40,50, is taken at the movable contact 51 of switch 50. Thus, contact 51 is connected to the gate electrode of a FET transistor Q8. The input circuit to the transistor Q8 includes a storage capacitor C19 that is connected to switch terminal 51 and that is returned to ground through a current-limiting resistor R36.

One of the main electrodes of the transistor Q8 is connected to the collector of an output transistor Q9 incorporated in an emitter-follower circuit. The other main electrode of the FET Q8 is connected to the base of transister Q9 and to a resistor R37 that is returned to the B— supply. The emitter of transistor Q9 is connected to a load resistor R38 that is returned to the B— supply. The emitter of transistor Q9 is further connected to a resistor R35 that is in turn connected to the inverting input of amplifier A7 to afford a negative feedback circuit. The emitter of transistor Q9 is also connected to a resistor R39 that is connected to one fixed contact 58 of the single-pole single-throw calibrating switch 21. The movable contact 59 of switch 21 is connected to the indicating instrument 19 which, in this instance, may comprise a conventional indicating microammeter. The other fixed terminal 61 of switch 21 is connected to the conductor 31 that constitutes the calibration output of phase shifter 14 (FIG. 2).

In considering the operation of the specific circuits illustrated in FIGS. 2 and 3, it may be noted that this particular construction was adopted for use in frequency deviation measurements applied to a 400 Hz A.C. generator. However, the reference frequency is by no means limited to 400 Hz and the illustrated circuit is operable over a relatively wide frequency range, with appropriate changes in components for different reference frequencies.

In the input standardizer circuit 12 (FIG. 2), the initial stage comprising amplifier A1, with the shunt input diode clippers CR1 and CR2 and the feedback diode clipper circuit comprising diodes CR3–CR6 and voltage regulator VR1, shapes any near-sinusoidal input signal supplied to input terminals 22 and 22A into a constant-amplitude square wave. The initial shaping circuit comprising amplifier A1 functions over a wide amplitude range; a typical range may be from about 1 volt to over 150 volts. The output signal from amplifier A1 is thus a square wave signal 71. The quadratic filter comprising the second amplifier A2 in input circuit 12 reshapes the square wave 71 into a constant-amplitude output signal 72 of essentially sinusoidal configuration, the distortion being approximately 5 percent. The overall gain of the input standardizer circuit 12 can be adjusted, by means of potentiometer R3, for calibration purposes.

With the frequency deviation monitor in operation, the zero switch 13A, 13B (FIGS. 2 and 3) is maintained in the position shown in the drawings. In this position, switch 13A couples the intermediate signal 72 developed by the input circuit 12 to both the keying generator 15 (FIG. 3) and the phase-shifter 14 (FIG. 2). The intermediate signal 72 has a frequency corresponding to the frequency of the input signal supplied to terminals 22 and 22A and, as noted above, has a constant amplitude. By utilizing a constant-amplitude intermediate signal for further operations in the circuit, possible errors due to amplitude variations in the input signal are avoided.

Phase-shifter 14 operates on the constant-amplitude sine wave intermediate signal 72 to generate a push-pull phase shift signal that is displaced 90° from the intermediate signal at the reference frequency, in this instance assumed to be 400 Hz, and that varies in phase with deviations in frequency. The particular circuit illustrated in FIG. 2, using the values set forth hereinafter, affords two output signals 73 and 74 that are displaced 180° in phase from each other and that are each displaced 90° in phase from the intermediate signal 72. The phase of each of the signals 73 and 74 varies by approximately 2.3° for each percent deviation in frequency of the intermediate signal relative to the 400 Hz. reference. Thus, the phase shift introduced by phase shifter 14 is roughly 0.6° per Hz. The operational amplifier A3, with its bridged-T feedback notch network and auxiliary input lag afforded by the input filter comprising resistor R8 and capacitor C5, functions as an active peaking network to develop the requisite phase shift. Amplifier A4 functions only as an inverting amplifier with a net gain of approximately unity. Phase-shifter 14 inherently provides additional filtering to minimize signal harmonics. To vary the reference frequency, potentiometer R12 may be adjusted, thereby changing the reference frequency about which operations of the phase-shifter are centered.

The initial stage in keying generator 15, comprising the operational amplifier A5, is an integrator that shifts the phase of the constant-amplitude sinusoidal intermediate signal 72, applied thereto through conductor 30, by 90°. This phase shift remains essentially constant for all frequencies in the vicinity of the reference, in this instance 400 Hz. The initial integrator stage of the keying generator, like phase-shifter 14, also provides additional filtering. The output signal from amplifier A5 is still a generally sinusoidal signal, as indicated by the waveform 75 in FIG. 3. The output voltage of the integrator varies somewhat over the frequency range of interest, but this has negligible effect on the keying signal developed by succeeding stages in generator 15. The sinusoidal output signal 75 from integrator amplifier A5 is applied to the differential squaring amplifier comprising transistors Q1 and Q2. The differential squaring amplifier 33 develops two series of differentiated negative-going spikes that are applied to the transistors Q3 and Q4 in the succeeding stage to produce two series of positive-going keying pulses for use in the sampling demodulator 16; the waveform of the key pulses is generally indicated by waveform 76. Thus, each of the two conductors 35 and 36 carries a key signal comprising a series of keying pulses; these key pulses have a duration much shorter than a half cycle of the intermediate signal 72 and recur at an integral multiple of the intermediate signal frequency, the preferred multiple being unity.

Figure 4:
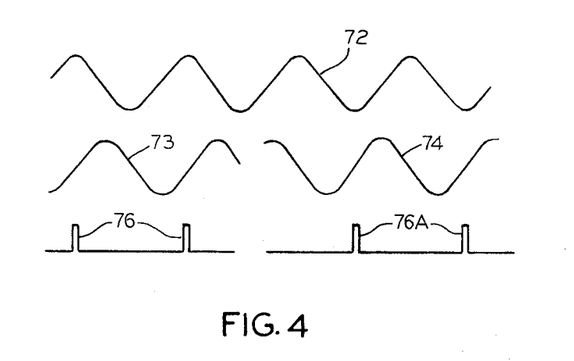
FIG. 4 is a series of wave diagrams employed in explaining the operation of the sampling demodulator of FIG. 3.

FIG. 4 illustrates the phase relationships between the intermediate signal 72 that constitutes the output signal of circuit 12, the phase shift signals 73 and 74 that constitute the output signals from phase-shifter 14, and the keying signals 76 and 76A that constitute the outputs from keying generator 15. In FIG. 4, it is assumed that the intermediate signal 72 has a frequency exactly coincident with the reference to which phase-shifter 14 is tuned, in this instance 400 Hz. Under these conditions, the keying pulses 76 and 76A occur in coincidence with the zero crossings of the phase shift signals 73 and 74 respectively. For any other frequency, the signals 73 and 74 are shifted in phase so that the zero crossings of those signals do not coincide with the key pulses 76 and 76A.

The FET switches Q5 and Q6 in sampling demodulator 16 are normally nonconductive and are switched on briefly and alternately by the keying signals from keying signal generator 15. The holding capacitor C18 is thus charged to the value of the phase-shift signal that exists at the time each keying pulse occurs. That is, once during each half cycle of the input signal to the system, one of the FET transistors Q5 and Q6 is rendered conductive and charges capacitor C18 to a voltage level indicative of the instantaneous amplitude of the phase-shift signal supplied to the FET transistor from phase-shifter 14. As long as the frequency of the signal supplied to the system corresponds precisely to the reference value to which phase-shifter 14 is tuned, the FET switches Q5 and Q6 go conductive in coincidence with the zero crossings of the phase shift signals 73 and 74 (FIG. 4) and no more than a negligible charge is applied to holding capacitor C18. The buffer transistor Q7 in the output stage of sampling demodulator 16 is provided with a zero adjustment comprising potentiometer R28, for calibration purposes.

For the specific circuit illustrated in FIG. 3, and using the circuit parameters set forth below, the output signals 73 and 74 from phase-shifter 14 have a peak amplitude of five volts. They are zero at the time of occurrence of each key pulse from keying generator 15 when the input frequency is at the reference value and the integrator output signal 75 (FIG. 3) is exactly in phase with the phase-shift signals. The phase-shift signals 73 and 74 each have an amplitude of 5 sine $\theta$, where $\theta$ is the relative phase shift of the phase-shift signals 73 and 74, at other frequencies in the general vicinity of the reference frequency to which phase-shifter 14 is tuned. This gives an approximate amplitude, at the time of occurrence of the keying pulses 76 and 76A, of 0.2 volts for a frequency deviation of one percent. Thus, the holding capacitor C18 in sampling demodulator 16 is charged to 0.2 volts for each one percent shift in frequency, a charge of 0.05 volts/Hz. The effect is roughly linear, with some droop for relatively large frequency shifts because of the sine term and the voltage decrease away from the tuned frequency (band width effect) in phase-shifter 14. It may be noted that the departure from a linear relationship is somewhat greater above the reference or null frequency than it is below that frequency.

Output amplifier 17 affords an overall gain, in the illustrated circuit, of approximately 5, so that the basic output voltage for the signal appearing at terminal 20 is 1 volt per percent frequency shift. The two shunt diodes CR12 and CR13 in the negative feedback circuit of operational amplifier A6 decrease the feedback amplitude, and hence increase the amplifier gain, progressively, for signal deviations in either direction from null. The linearity control potentiometer serves to adjust this effect. The diode CR11 in the input circuit to amplifier A6 increases the gain for signals corresponding to frequencies above null only, and this effect is adjusted by means of the symmetry potentiometer R31. The output signal appearing at terminal 20 has an amplitude representative of the amount of deviation of the input signal from the reference frequency and has a polarity representative of the direction of the frequency deviation, whether above or below the reference frequency. No additional filtering is required.

The output signal for the system constitutes a series of sample voltages, the sampling rate being twice the input frequency; between samples, the output is held approximately constant at the last previous voltage value on capacitor C18. For an input signal of constant frequency, whether at the reference frequency or at some deviation frequency, there is essentially no ripple in the output signal appearing at terminal 39 except possibly a square wave component of quite small amplitude resulting from imperfect matching in the internal circuits of the system.

For a varying input frequency the pattern of the voltage for the output signal at terminal 20 is an analog of the input frequency pattern. More specifically, the output signal voltage is a stepwise approximation of the input frequency pattern, consituting a series of samples with each sample being held briefly until the next sample. The delay inherent in waiting for a new sample, and minor delays resulting from the band width effects of the various circuits in the frequency deviation monitor, cause the output voltage pattern to be delayed slightly in comparison with the true input frequency pattern. This time shift closely approaches a true time delay rather than a lag of the kind caused by conventional filtering circuits. Consequently, sharp changes and peaks in the input frequency pattern are reproduced accurately in the voltage waveform appearing at terminal 20, within the limitations of the sampling frequency, and are not smoothed away; they can be accurately and effectively displayed and recorded by an oscilloscope, pen recorder, etc.

Peak holder circuit 18 serves only the indicating instrument 19. In the illustrated circuit, amplifier A7 affords a gain of only about one-half, a reduced voltage swing being employed to allow for desired bias voltages. With switches 40 and 50 in the position illustrated in FIG. 3, the output from amplifier A7 is supplied directly to the base of transistor Q8, bypassing diode CR14. Under these circumstances, peak holder 18 functions as a normal amplifier but with an internal capacitive load. Amplifier A7 is capable of changing the charge on the holding capacitor C19 in the input circuit to transistor Q8 sufficiently rapidly to follow quick fluctuations in the output circuit from amplifier 17, and instrument 19 affords an indication of these fluctuations within the limits of the dynamic capabilities of the indicator.

If switch 40 is thrown to its alternate position, the signal from amplifier A7 is applied to capacitor C19 and to the base of transistor Q8 through diode CR14. Similarly, if switch 40 remains unchanged and switch 50 is thrown to its alternate condition, the signal from amplifier A7 is applied to capacitor C19 and transistor Q8 through diode C14 but with the diode connected in opposite polarization in the circuit. Under either of these conditions, with diode CR14 in the circuit, the amplifier output is driven normally away from zero in one direction but cannot return and hence retains the maximum attained charge on capacitor C19. This charge decays quite slowly, the time constant being the capacitance of the capacitor C19 multiplied by the very high input impedance of the FET transistor Q8. On the other hand, the charge on capacitor C19 can be returned almost instantly to the prevailing correct value by again bypassing the diode; this is accomplished by returning switches 40 and 50 to the illustrated positions.

The calibration switch 21 switches the indicating instrument 19 from the output of peak holder 18 to the resistor network R15 and R16 (FIG. 2) that sums the rectified outputs of phase-shifter 1r with a bias current. This gives an expanded-scale readout of signal amplitude, on instrument 19, for calibration purposes.

In order to afford a more concrete example of the present invention, specific circuit parameters are set forth hereinafter for the construction illustrated in FIGS. 2 and 3. It should be understood that these data are provided merely by way of illustration and in no sense as a limitation on the invention.

RESISTORS

| | |
|---|---|
| R1 | 100 kilohms |
| R2 | 47 kilohms |
| R3, R31, R32 | 5 kilohms |
| R4, R34 | 20 kilohms |
| R5, R6, R13, R14, R47, R48, R51, R28, R35, R37 | 10 kilohms |
| R7, R52, R25 | 150 kilohms |
| R8, R9 | 12.7 kilohms |
| R10 | 15 kilohms |
| R11 | 750 ohms |
| R12 | 500 ohms |
| R15 | 6.2 kilohms |
| R16 (selected for calibration) | 62 kilohms |
| R17, R18 | 9.1 kilohms |
| R19, R20 | 220 kilohms |
| R21 | 2.2 kilohms |
| R22 (selected for ripple suppression) | 1.6 megohms |
| R49, R50 | 4.7 kilohms |
| R23, R24 | 15 kilohms |
| R26 | 22 megohms |
| R27 | 1.8 kilohms |
| R29 | 1 kilohm |
| R30 | 22 kilohms |
| R33 | 27 kilohms |
| R36 | 100 ohms |
| R38 | 3.9 kilohms |
| R39 (selected for full scale readout) | 47 kilohms |

CAPACITORS

| | |
|---|---|
| C1, C6, C7, C13 | 0.1 microfarad |
| C2 | 0.16 microfarad |
| C3, C11, C18 | 0.01 microfarad |
| C4, C8, C9, C10 | 1.0 microfarad |
| C5 | 0.062 microfarad |
| C12 | 0.022 microfarad |
| C14, C15 | 1100 picofarad |
| C16, C17 | 10 picofarad |
| C19 | 1.0 microfarad |

SEMICONDUCTOR DEVICES

| | |
|---|---|
| A1 through A7 | 741 |
| Q1, Q2, Q3, Q4, Q9 | 2N3904 |
| Q5, Q6 | 2N5653 |
| Q7, Q8 | 2N5458 |
| CR1 through CR14 | 1N4446 |
| VR1, VR2 | 1N52318 |

SUPPLY VOLTAGES

| | |
|---|---|
| B+ | +15 volts D.C. |
| B− | −15 volts D.C. |

OTHER PARAMETERS

| | |
|---|---|
| Reference frequency | 400 Hz, adjustable ±2% |
| Input voltage | 1 volt minimum |
| | 150 volts maximum |
| Input impedance | 100 kilohms |
| Deviation range | ±10% |
| Meter hold duration | 10 seconds, negligible delay |
| | 30 seconds, decay of 10% |
| Hold capture pulse width | 5 milliseconds minimum |
| D.C. input tolerance | 200 volts |

The frequency deviation monitor 10, as described above, affords a wide band frequency discriminator that generates a voltage output, on terminal 20, proportional to the instantaneous deviation of an input signal from the internally set reference frequency determined in phase-shifter circuit 14. The speed of response for the system is adequate for modulation frequencies in excess of 10 percent of the nominal reference frequency. The system affords an instrument readout as well as a voltage output, with an effective peak holding circuit for the indicating instrument. Operation is essentially independent of input voltage over a wide range. The output signal voltage has negligible ripple and requires no external filtering. The complete system is relatively simple and inexpensive in construction yet highly reliable in operation.

I claim:

1. A frequency deviation monitor for measuring the instantaneous deviation of an input signal from a reference frequency, comprising:
    an input circuit for developing an intermediate signal having a frequency corresponding to the frequency of an input signal applied thereto and having a constant amplitude;
    phase-shifting means, coupled to the input circuit, for generating a phase-shift signal having a frequency corresponding to the frequency of the intermediate signal but shifted in phase by an amount and in a direction indicative of any deviation of the intermediate signal, and hence the input signal, from a given reference frequency;
    key signal generator means, coupled to the input circuit, for generating a key signal comprising a series of key pulses each having a duration much shorter than a half-cycle of the intermediate signal and recurring at an integral multiple of the intermediate signal frequency;
    and a sampling demodulator, coupled to the phase-shifting means and to the key signal generator means, for sampling the phase-shift signal at time intervals determined by the key signal pulses to develop an output signal having an amplitude and polarity representative of the instantaneous deviation of the input signal from the reference frequency.

2. A frequency deviation monitor, according to claim 1, in which the phase-shifting means comprises an active peaking network including an amplifier having a negative feedback circuit which comprises a tunable bridged-T notch filter, tuned to the given reference frequency.

3. A frequency deviation monitor, according to claim 2, in which the phase-shifting means further comprises an inverter coupled to the output of the amplifier, producing two phase-shift signals displaced 180° relative to each other.

4. A frequency deviation monitor, according to claim 1, in which the phase-shifting means generates two phase-shift signals corresponding in frequency and amplitude but displaced 180° relative to each other, and in which the key signal generator means generates two key signals displaced 180° relative to each other, the sampling demodulator utilizing each key signal to sample one phase-shift signal and thus afford a sampling rate of twice the input signal frequency.

5. A frequency deviation monitor, according to claim 4, in which the key signal generator means comprises an integrator coupled to a push-pull differentiator, developing key signal pulses that coincide with zero crossings of the phase-shift signals whenever the input signal frequency corresponds to the given reference frequency.

6. A frequency deviation monitor according to claim 4 in which the sampling demodulator comprises a storage capacitor, and two semiconductor gates each having a main conduction path connected to the storage capacitor for applying the instantaneous phase-shift signals to the storage capacitor, the semiconductor gates each having a gate electrode to which one of the two keying signals is applied.

7. A frequency deviation monitor, according to claim 1, and further comprising output circuit means, coupled to the demodulator, correcting the output signal for non-linearity in the phase-shift signal amplitudes, relative to frequency variations, to afford a corrected output signal that varies approximately linearly with phase over a range of frequencies up to 10 percent above and below the reference frequency.

8. A frequency deviation monitor, according to claim 7, and further comprising an indicating instrument, coupled to the output circuit means, actuated by the corrected output signal to afford an instantaneous indication of the frequency of the input signal.

9. A frequency deviation monitor, according to claim 8, and further comprising peak holder means, interposed between the output circuit means and the indicating instrument, for storing the maximum amplitude of the corrected output signal for a substantial period of time to allow effective determination of maximum frequency changes in the input signal.

* * * * *